United States Patent [19]

Hung

[11] Patent Number: 5,231,154

[45] Date of Patent: Jul. 27, 1993

[54] IODINE CONTAINING CHAIN TRANSFER ANGENTS FOR FLUOROPOLYMER POLYMERIZATIONS

[75] Inventor: Ming-Hong Hung, Wilmington, Del.

[73] Assignee: E. I. DuPont de Nemours and Company, Wilmington, Del.

[21] Appl. No.: 951,526

[22] Filed: Sep. 25, 1992

[51] Int. Cl.$^5$ .............................................. C08F 2/38
[52] U.S. Cl. .................................... 526/206; 526/247; 526/254
[58] Field of Search ........................................ 526/206

[56] References Cited

U.S. PATENT DOCUMENTS

| | | | |
|---|---|---|---|
| 4,000,356 | 12/1976 | Weisgerber et al. | 526/206 |
| 4,152,506 | 5/1979 | Novak | 526/206 |
| 4,158,678 | 6/1979 | Tatemoto et al. | 260/884 |
| 4,234,770 | 1/1981 | Tatemoto et al. | 525/331 |
| 4,361,678 | 11/1982 | Tatemoto et al. | 528/374 |
| 4,581,418 | 4/1986 | Serratelli et al. | 526/206 |
| 4,745,165 | 5/1988 | Arcella et al. | 526/206 |
| 4,948,852 | 8/1990 | Moore | 526/247 |
| 4,948,853 | 8/1990 | Logothetis | 526/247 |
| 4,973,634 | 11/1990 | Logothetis | 526/206 |
| 4,983,697 | 1/1991 | Logothetis | 526/206 |
| 5,053,468 | 10/1991 | Branlard et al. | 526/206 |

FOREIGN PATENT DOCUMENTS

| | | | |
|---|---|---|---|
| 0027721 | 4/1981 | European Pat. Off. | 526/206 |
| 0219065 | 4/1987 | European Pat. Off. | 526/206 |
| 60-221409 | 11/1985 | Japan | 526/206 |
| 1-319512 | 12/1989 | Japan . | |

Primary Examiner—Joseph L. Schofer
Assistant Examiner—N. Sarofim
Attorney, Agent, or Firm—Barbara C. Siegell

[57] ABSTRACT

An improved process for the polymerization of fluoromonomers to fluoropolymers which comprises using as a chain transfer agent the compound $Y(CF_2)_mCH_2CH_2I$, wherein m is 3 to 12, and Y is F or $-CH_2CH_2I$.

16 Claims, No Drawings

IODINE CONTAINING CHAIN TRANSFER ANGENTS FOR FLUOROPOLYMER POLYMERIZATIONS

FIELD OF THE INVENTION

This invention discloses fluorinated iodides used as novel chain transfer agents in the free radical polymerization of fluorinated olefins to form fluoropolymers.

BACKGROUND OF THE INVENTION

In free radical polymerizations of fluorinated olefins to form fluoropolymers, it is often desirable to produce polymers that are of lower molecular weight than those obtained where only the initiator and monomer(s) are present. Chain transfer agents are added to lower the average molecular weight of the fluoropolymer obtained. It is often preferred, particularly in fluoroelastomers, that during the chain transfer process an end group is produced which will chain extend or crosslink during curing (crosslinking) of the fluoropolymer. Iodide end groups can undergo chain extension and/or crosslinking, so a process that gives such end groups is desirable.

U.S. Pat. Nos. 4,158,678, 4,234,770 and 4,361,678 describe the polymerization of fluorinated monomers to fluoropolymers in the presence of (cyclo)aliphatic (some containing an olefinic bond) mono- or diiodides which also contain fluorine, and optionally chlorine and/or hydrogen.

U.S. Pat. No. 4,000,356 describes the polymerization of fluorinated monomers to fluoropolymers in the presence of aliphatic (possibly containing an olefinic bond) iodides which also contain fluorine and chlorine and/or hydrogen.

Japanese Patent Application 1-319,512 describes the use of alkyl mono- and diiodides containing 1-3 carbon atoms, such as 1,3-diiodopropane and methylene iodide as chain transfer agents for fluoroelastomer polymerizations.

U.S. Pat. No. 4,948,852 describes the use of mono- or diiodides which are perfluorinated or perfluorochlorocarbons in selected fluoroelastomer polymerizations.

U.S. Pat. Nos. 4,948,853 and 4,983,697 describe the use of alkyl mono- and diiodides in polymerizations to perfluoroelastomers.

No mention is made in the above references of the iodides disclosed herein as chain transfer agents.

SUMMARY OF THE INVENTION

This invention concerns a process for the free radical initiated polymerization of one or more fluoroolefins to a fluoropolymer, wherein the improvement comprises the presence of a chain transfer agent of the formula $Y(CF_2)_mCH_2CH_2I$, wherein m is an integer of 3 to 12, and Y is F or $-CH_2CH_2I$.

DETAILS OF THE INVENTION

The free radical polymerization of fluoroolefins to fluoropolymers is well known. By a fluoroolefin herein is meant any olefin which has one or more vinylic fluorine atoms. Useful fluoroolefins include, but are not limited to, vinyl fluoride, vinylidene fluoride, trifluoroethylene, tetrafluoroethylene, hexafluoropropylene, perfluoro(methyl vinyl ether), perfluoro(propyl vinyl ether), and chlorotrifluoroethylene. The fluoropolymers may in addition contain up to about 5 mole percent of total monomers present of a monomer that does not contain vinylic fluorine, such as a curesite monomer for a fluoroelastomer.

It is preferred if the process described herein is carried out to produce a fluoroelastomer. By fluoroelastomer is meant any homo- or copolymer made from one or more fluoroolefins whose glass transition temperature is at or below about 40° C., preferably at or below about 25° C. Useful fluoroelastomers include copolymers of hexafluoropropylene and vinylidene fluoride; hexafluoropropylene, tetrafluoroethylene and vinylidene fluoride; and tetrafluoroethylene and perfluoro(methyl vinyl ether). Perfluoroelastomers are another preferred class of fluoroelastomers.

Free radical polymerizations that produce fluoropolymers are initiated by the use of free radical initiators. Such compounds are known and include for example, ammonium persulfate, perfluoro(propionyl peroxide), and bis(4-t-butylcyclohexyl)peroxydicarbonate. Other common polymerization ingredients include surfactants (for emulsion or suspension polymerization), solvents for various ingredients such as the chain transfer agent, an organic solvent or suspension medium, such as water. These polymerizations may be run, for example, as aqueous emulsions, aqueous suspensions, nonaqueous suspensions, and solution. Aqueous emulsion polymerization is preferred herein. They may be batch, semibatch, or continuous. Monomers may be added in the gas phase or, in the case of higher boiling monomers, as solutions in organic solvents. Agitation is normally employed, and the polymerizations are often run under pressure to insure adequate concentrations of gaseous monomers. Such polymerizations are often run at temperatures from about 0° C. to about 150° C., preferably about 40° C. to about 130° C., and the initiator is often partially chosen with the polymerization temperature in mind. Such polymerizations are disclosed, for instance, in U.S. Pat. Nos. 4,158,678, 4,243,770, 4,361,678, 4,948,852, 4,948,853, and 4,983,697, which are all hereby included by reference. See also H. Mark, et al., Ed., Encyclopedia of Polymer Science and Technology, 2nd. Ed., John Wiley & Sons, New York, 1987, Vol. 6, p. 257-269, and Vol. 16, p. 577-648, both of which are also included by reference.

Many polymerizations of fluoromonomers chain transfer or chain terminate readily with various organic compounds. If the organic compound chain terminates the "polymerization", the yield of polymer may be small or no polymer may be obtained. While chain transfer may be desired in many polymerizations to lower the molecular weight of the resulting fluoropolymer, it is often preferred if the chain transfer is done with a chain transfer agent which results in reactive end groups on the polymer molecules. If such reactive ends are present, they allow the fluoropolymer to be chain extended and/or crosslinked more readily, and the resulting polymer will often have better physical properties that a fluoropolymer without reactive end groups. It is also preferred if a chain transfer agent yields a narrow or low molecular weight distribution (MWD) [weight average molecular weight (Mw)/number average molecular weight (Mn)], particularly about 2 or less. This generally leads to better physical properties at a given fluoropolymer viscosity.

Iodine ends groups are reactive in these polymers, so chain transfer agents that result in ends groups containing iodine have been sought. It is preferred to use diiodides since chain transfer with the first iodide gives iodine end groups on both the polymer chain which is terminated, and the polymer chain which is initiated. However one must be cautious in choosing such chain transfer agents, for they may result not just in chain transfer, but also in chain termination reactions. If the latter occurs, yields of polymer will be lower or polymer may not be obtained at all. The chain transfer agents disclosed herein chain transfer readily without much apparent chain termination, even though the nearest fluorine atoms to the iodine are in the gamma position to the iodine, and give fluoropolymers, particularly fluoroelastomers, with relatively narrow MWD. In contrast, iodine containing chain transfer agents that are not fluorinated at all often apparently result in mostly chain termination, since little or no polymer is usually obtained (see Comparative Examples 1 to 5).

The improved iodine chain transfer agent herein has the formula $Y(CF_2)_mCH_2I$, m is an integer of 3 to 12, and Y is F or $-CH_2CH_2I$. In preferred chain transfer agents, Y is $-CH_2CH_2I$ and m is 4 to 10. The amount of chain transfer agent used will depend on many factors, such as the particular monomers being polymerized, what type of polymerization is being done (emulsion, solution, etc.), and the desired molecular weight of the final polymer. However, the amount of chain transfer agent used will usually be less than about 1% by weight of the total amount of monomers added to the polymerization. A desired molecular weight is often designated as a polymer viscosity, which is proportional to molecular weight.

The chain transfer agents disclosed herein have the added benefit of being relatively easily made from readily available starting materials, and being relatively stable, so they can be stored and used without further purification. In contrast, perfluorinated iodides decompose readily on exposure to light, and often must be purified just before use, as by distillation.

Fluoropolymers produced by the process described herein are useful in various rubber and plastic parts, particularly where high temperature resistance and/or chemical resistance are required. This makes these parts particularly useful in the chemical process industry, and in sealing applications, such as O-rings and chevron rings where high temperature resistance and/or chemical resistance is required.

EXPERIMENT 1

The Synthesis of 1,6-Diiodo-3,3,4,4-Tetrafluorohexane: $(I-(CH_2)_2-(CF_2)_2-(CH_2)_2-I)$ In a 360 ml Hastelloy-C shaker tube was charged 1,2-diiodotetrafluoroethane (70.8 g, 0.2 mole) and d-limonene (0.3 g). The tube was cool-evacuated and ethylene (17 g, 0.607 mole) was transferred into the tube. The tube was sealed and heated at 220° C. for 10 hours under continuous shaking conditions. The tube was cooled, the product inside the tube was dissolved in 1,1,2-trichloro-1,2,2-trifluoroethane (F113) and washed with saturated aqueous $Na_2S_2O_3$ solution. The organic phase was separated, dried over magnesium sulfate, F-113 was removed in vacuo to give the title product as a solid. Yield: 41 g (50%), Mp. 111.5°–114° C.

$I-(CH_2)_2-(CF_2)_4-(CH_2)_2-I$ and $I-(CH_2)_2-(CF_2)_6-(CH_2)_2-I$ were synthesized in the same procedure by using 1,4-diiodoperfluorobutane and 1,6-diiodoperfluorohexane as the starting material respectively. $I-(CH_2)_2-(CF_2)_4-(CH_2)_2-I$, Mp. 90.5°–91.5° C.; $I-(CH_2)_2-(CF_2)_6-(CH_2)_2-I$, Mp. 87°–89° C.

GENERAL PROCEDURE FOR FLUOROELASTOMER POLYMERIZATION IN EXAMPLES 1-5 AND COMPARATIVE EXAMPLES 1-5

A semi-batch emulsion polymerization was carried out in a well-stirred 5.5-liter stainless steel reaction vessel. The reactor was filled with 4.2 Kg of deionized water containing 9 g of ammonium perfluorononanoate (Surflon® S111 from Asahi Glass, Japan). Then specific amounts of ammonium persulfate initiator and chain transfer agent (as the form of F-113 solution) were added. The reactor was sealed and heated to 80° C. The polymerization was started by introducing a gaseous monomer mixture consisting of 21 g/h tetrafluoroethylene (TFE), 201 g/h hexafluoropropylene (HFP), and 78 g/h of vinylidene fluoride ($VF_2$) fed through a diaphragm 5 compressor. The internal pressure was kept at 1.17–1.31 MPa, and ammonium persulfate was added as needed to maintain the polymerization process at this pressure.

The polymerization was allowed to proceed for approximately 14 hours. The reaction vessel was cooled and the residual monomers were removed through a degassing vessel at atmospheric pressure. The polymer dispersion was discharged from the reactor and generally contained 15-28 weight percent solid. The fluoroelastomer was isolated from the dispersion by coagulating with potassium aluminum sulfate solution. The coagulated polymer was allowed to settle, and supernatant serum was removed. The resulting polymer was washed by reslurrying in water twice before filtering. The wet crumb was dried in an air oven at 50 to 60° C. to a moisture content of less than 1%.

The amount of polymer obtained was in the range of 0.9 to 1.6 Kg. The polymer composition was determined by infrared spectroscopy. The resulting polymers are amorphous and have glass transition temperature of $-15$ to $-20°$ C. as determined by Differential Scanning Calorimetry (heating rate: 10° C./min, onset of transition). The fluoroelastomer inherent viscosity was measured at 30° C. in methyl ethyl ketone and Mooney viscosity was measured as ML10 (at 100 and 120° C. respectively).

The number average molecular weight, $M_n$, was determined by membrane osmometry measurements in methyl ethyl ketone. The ratio of weight average to number average molecular weight, $M_w/M_n$, was estimated from molecular weight determinations in dimethylacetamide solvent at 135° C. using a Waters Associates gel permeation Chromatograph. The above data are summarized in Table 1.

TABLE 1

| Example No. | — | — | 1 | 2 | 3 | 4 | 5 | — | — | — |
|---|---|---|---|---|---|---|---|---|---|---|
| Comparative Example | 1 | 2 | — | — | — | — | — | 3 | 4 | 5 |
| CTA (g)[a] | 4.03 (i) | 4.03 (i) | 3.98 (ii) | 3.98 (ii) | 4.0 (iii) | 6.64 (ii) | 6.66 (iii) | 3.96 (iv) | 3.98 (v) | 4.0 (vi) |
| Composition[b] $VF_2$ (mole %) | 48.9 | 48.6 | 49.0 | 49.2 | 49.1 | 49.2 | 49.3 | — | — | — |

TABLE 1-continued

| Example No. | — | — | 1 | 2 | 3 | 4 | 5 | — | — | — |
|---|---|---|---|---|---|---|---|---|---|---|
| Comparative Example | 1 | 2 | — | — | — | — | — | 3 | 4 | 5 |
| HFP | 30.9 | 31.0 | 30.3 | 29.9 | 29.7 | 30.8 | 30.0 | — | — | — |
| TFE | 20.2 | 20.4 | 20.7 | 20.9 | 21.2 | 19.9 | 20.7 | — | — | — |
| Total APS (g) | 1.135 | 1.40 | 0.695 | 0.65 | 0.238 | 0.475 | 0.538 | — | — | — |
| Iodine (%) Incorporated | 0.40 | 0.30 | 0.18 | 0.20 | 0.19 | 0.29 | 0.30 | — | — | — |
| Polymer (g) | 836 | 1200 | 1240 | 1160 | 1520 | 1400 | 1420 | — | — | — |
| ML-10 (100° C.) | 14 | 20 | 37 | 41 | 49 | 18 | 18 | — | — | — |
| ML-10 (121° C.) | 7 | 10 | 18 | 19 | 24 | 7 | 7 | — | — | — |
| Inh. Viscosity | 0.58 | 0.56 | 0.523 | 0.556 | 0.581 | 0.467 | 0.465 | — | — | — |
| $T_g$ (°C.) | −17.5 | −17.7 | −16.3 | −16.3 | −17.0 | −17.0 | −17.4 | — | — | — |
| $M_w/M_n$ | 3.70 | 3.12 | 1.87 | 1.63 | 1.66 | 1.73 | 1.61 | — | — | — |

[a]CTA: Chain Transfer Agent (i) $CH_2I_2$; (ii) $I-(CH_2)_2-(CF_2)_4-(CH_2)_2-I$; (iii) $I-(CH_2)_2-(CF_2)_6-(CH_2)_2-I$; (iv) $I-(CH_2)_2-(CF_2)_2-(CH_2)_2-I$; (v) $I-(CH_2)_4-I$; (vi) $I-(CH_2)_6-I$
[b]Determined by IR spectroscopy The fluoroelastomer compositions which were cured were prepared by mixing the following ingredients on a two-roll rubber mill whose rolls were kept at about 25° C: 100 parts fluoroelastomer, 30 parts MT black, 3 parts sublimed litharge, 3 parts triallyl isocyanurate (TAIC) and 3 parts "Luperco" 101-XL peroxide [45% of 1,5-dimethyl-1,5-di(t-butyl peroxy)hexane and 55% inert filler]. Cure characteristics of the composition were measured with an oscillating disk rheometer (ODR) at a cure time of 12 minutes at 177° C., according to ASTM D-2084. Test samples were press-cured for 10 minutes at 177° C., and post-cured in a circulating air oven for 16 hours at 200° C. Stress-strain properties were determined according to ASTM D-412. Compression set was measured on O-rings in air after 22 hours at 200° C. Results are given in Table 2.

TABLE 2

| Recipe, phr | | |
|---|---|---|
| Polymer from Example 2 | 100 | 0 |
| Polymer from Example 3 | 0 | 100 |
| MT Black | 30 | 30 |
| Litharge | 3 | 3 |
| TAIC | 3 | 3 |
| Luperco 101 XL | 3 | 3 |
| ODR, 177° C. | | |
| ML (J) | 0.51 | 0.57 |
| Ts2 (min.) | 1.3 | 1.0 |
| T'50 (min.) | 2.0 | 1.8 |
| T'90 (min.) | 2.6 | 3.0 |
| MH (J) | 8.7 | 8.6 |
| Stress-Strain (post-cured) | | |
| M50 (MPa) | 1.58 | 1.58 |
| M100 (MPa) | 2.34 | 2.45 |
| Tb (MPa) | 10.9 | 11.0 |
| Eb (%) | 425 | 425 |
| Hardness, A, Pts. | 74 | 74 |
| Compression set, (%) O-Rings, 22 h/200° C. | 53 | 53 |

EXAMPLES 6 AND 7 COMPARATIVE EXAMPLES 6 AND 7

The polymerizations were run shaker tubes at 70° C./4 hrs. The following procedure was followed:

In a 400 ml shaker tube were placed 150 ml of distilled water, 1.5-2.5 g of the ammonium salt of perfluorooctanoic acid, 0.5 g of disodiumhydrogenphosphate, 0.2 g of ammonium persulfate and the amount of the diiodide indicated in Table 3. In the case of the hydrogen containing diiodides which are solids, they were first dissolved in 5 g FC-113 (trichlorotrifluoroethane) and then charged in the tube. In the case of perfluoroalkyldiiodides they were charged as liquids. The shaker tube was cooled to about −20° C., evacuated and the gaseous monomers were charged in the amounts as indicated in Table 3. The shaker tube was allowed to heat to 70° C. with shaking and the pressure was followed. It usually climbed to 300-400 psig and then as the polymerization proceeded, the pressure slowly dropped. After about 4 hrs, the pressure drop had stopped. The shaker tube was cooled to room temperature, the gases were vented, the tube opened and the emulsion was poured in a jar. The stable emulsion was coagulated by pouring it into a stirred solution of 10 g magnesium sulfate heptahydrate in 1000 ml of water at 90° C. The polymer was isolated by filtration, washed five times with hot water and then dried in a vacuum oven at 80°-90° C. overnight.

The polymer composition was determined by infrared spectroscopy and $^{19}F$ nmr spectroscopy. The melting points were determined by Differential Scanning Calorimetry (DSC) and the melt flow by melt index at the temperature indicated in Table 3.

The tensile properties were determined on thin films using the ASTM D1708 method. Irradiation was done on dumbbells by exposing the samples to an electron beam.

The iodine content was determined by elemental analysis. All results are given in Table 3.

TABLE 3

| Example | — | 6 | 7 | — |
|---|---|---|---|---|
| Comparative Example | 6 | — | — | 7 |
| MONOMER FEED | | | | |
| TFE, g | 50 | 50 | 50 | 50 |
| PMVE, g | 2.0 | 2.5 | 30 | 30 |
| I(CF$_2$)$_4$I, g | 0.1 | — | — | 0.3 |
| ICH$_2$CH$_2$(CF$_2$)$_4$CH$_2$CH$_2$I, g | — | 0.1 | 0.3 | — |
| POLYMER COMPOSITIONS | | | | |
| PMVE, wt % | 8.1 | 5.7 | 24.2 | 28.9 |
| Iodine, wt % | 0.14 | 0.19 | 0.20 | 0.16 |
| DSC Tm, °C. | | | | |
| First Heat | 303 | 310 | 267 | 261 |
| Reheat | 300 | 308 | 258 | 246 |
| Melt Index, g/10 mins | | | | |
| 350° C. | 0.85 | 1.66 | — | — |
| 275° C. | — | — | 0.95 | 14.5 |
| Tensile Properties | | | | |
| M100, MPa | 14.8 | weak film | 8.8 | 7.0 |
| Tb, MPa | 28.4 | | 15.4 | 17.4 |
| Eb, % | 428 | | 500 | 560 |
| HEATED TO >300° C./ 30 min | | | | |
| PMVE, wt % | | | 23.5 | 28.2 |
| Iodine, wt % | | | <0.01 | <0.01 |
| Melt Index, 275° C./10 min | | | 5.7 | 25.8 |

TABLE 3-continued

| Example | — | 6 | 7 | — |
|---|---|---|---|---|
| Comparative Example | 6 | — | — | 7 |
| M100, MPa | | | 9.8 | 6.2 |
| Tb, MPa | | | 9.9 | 6.6 |
| Eb, % | | | 207 | 252 |
| Irradiated, 15 Mrads[1] | | | | |
| Iodine, wt % | | | 0.11 | 0.13 |
| M100, MPa | | | 10.0 | 8.4 |
| Tb, MPa | | | 10.7 | 12.1 |
| Eb, % | | | 170 | 296 |

[1]Electron Beam

What is claimed is:

1. A process for the free radical initiated polymerization of one or more fluoroolefins to a fluoropolymer, wherein the improvement comprises the presence of a chain transfer agent of the formula $Y(CF_2)_mCH_2CH_2I$, wherein m is an of integer 3 to 12, and Y is F or $-CH_2CH_2I$.

2. The process as recited in claim 1 wherein Y is $-CH_2CH_2I$.

3. The process as recited in claim 1 wherein m is 4 to 10.

4. The process as recited in claim 2 wherein m is 4 to 10.

5. The process as recited in claim 1 wherein said fluoropolymer is a fluoroelastomer.

6. The process as recited in claim 5 wherein said fluoroelastomer is a copolymer of hexafluoropropylene and vinylidene fluoride; hexafluoropropylene, tetrafluoroethylene and vinylidene fluoride; and tetrafluoroethylene and perfluoro(methyl vinyl ether).

7. The process as recited in claim 4 wherein said fluoropolymer is a fluoroelastomer.

8. The process as recited in claim 7 wherein said fluoroelastomer is a copolymer of hexafluoropropylene and vinylidene fluoride; hexafluoropropylene, tetrafluoroethylene and vinylidene fluoride; and tetrafluoroethylene and perfluoro(methyl vinyl ether).

9. The process as recited in claim 5 wherein said fluoroelastomer is a perfluoroelastomer.

10. The product of the process of claim 1.

11. The product of the process of claim 2.

12. The product of the process of claim 6.

13. The product of the process of claim 10.

14. The product of the process of claim 5.

15. The process as recited in claim 1 wherein said fluoroolefin is vinyl fluoride, vinylidene fluoride, trifluoroethylene, tetrafluoroethylene, hexafluoropropylene, perfluoro(methyl vinyl ether), perfluoro(propyl vinyl ether), or chlorotrifluoroethylene.

16. The process as recited in claim 1 wherein up to 5 mole percent of an olefin which does not have a vinylic fluorine atom is polymerized into the fluoropolymer.

* * * * *